(12) United States Patent
Murphy

(10) Patent No.: US 9,488,514 B2
(45) Date of Patent: Nov. 8, 2016

(54) THREE-MODE SENSOR FOR DETERMINING TEMPERATURE, LEVEL, AND CONCENTRATION OF A FLUID

(71) Applicant: SSI Technologies, Inc., Janesville, WI (US)

(72) Inventor: Gregory P. Murphy, Janesville, WI (US)

(73) Assignee: SSI Technologies, Inc., Janesville, WI (US)

( * ) Notice: Subject to any disclaimer, the term of this patent is extended or adjusted under 35 U.S.C. 154(b) by 247 days.

(21) Appl. No.: 13/741,519

(22) Filed: Jan. 15, 2013

(65) Prior Publication Data

US 2014/0196536 A1   Jul. 17, 2014

(51) Int. Cl.
| | | |
|---|---|---|
| G01F 23/00 | (2006.01) | |
| G01F 23/296 | (2006.01) | |
| G01F 25/00 | (2006.01) | |
| G01S 15/10 | (2006.01) | |

(52) U.S. Cl.
CPC ......... *G01F 23/296* (2013.01); *G01F 23/0069* (2013.01); *G01F 23/2962* (2013.01); *G01F 25/0061* (2013.01); *G01S 15/10* (2013.01)

(58) Field of Classification Search
CPC ............ G01F 23/2962; G01F 23/284; G01F 23/296; G01F 23/2961; G01F 23/2967
USPC ...... 73/290 V, 35.07, 170.08, 170.09, 290 R, 73/1.86, 1.82, 1.83
See application file for complete search history.

(56) References Cited

U.S. PATENT DOCUMENTS

| | | | |
|---|---|---|---|
| 6,151,956 A | 11/2000 | Takahashi et al. | |
| 6,484,088 B1* | 11/2002 | Reimer ................. | G01F 23/296 340/450.2 |
| 6,588,269 B1* | 7/2003 | Benghezal .......... | G01F 23/2962 181/124 |
| 7,542,870 B2 | 6/2009 | Reimer et al. | |
| 7,966,136 B2 | 6/2011 | Reimer et al. | |
| 8,469,889 B2* | 6/2013 | Suzuki ................. | A61B 8/0858 600/407 |
| 2002/0078737 A1* | 6/2002 | Zanker .................... | G01F 1/662 73/61.79 |
| 2003/0097070 A1* | 5/2003 | Nakaya ................. | A61B 8/463 600/447 |
| 2004/0007061 A1* | 1/2004 | Forgue ................ | G01F 23/2968 73/290 V |
| 2007/0203668 A1* | 8/2007 | Reimer ............... | G01F 25/0061 702/159 |
| 2007/0261495 A1* | 11/2007 | Van Der Ent ...... | G01N 29/2456 73/622 |
| 2010/0262386 A1* | 10/2010 | Reimer et al. ................... | 702/55 |
| 2011/0096958 A1* | 4/2011 | Fukumoto ............ | A61B 5/0048 382/106 |
| 2011/0125019 A1* | 5/2011 | Shiina ................. | A61B 5/0048 600/443 |
| 2011/0301883 A1* | 12/2011 | Murphy .............. | G01F 23/2962 702/55 |
| 2012/0118059 A1* | 5/2012 | Reimer ................. | F01N 3/2066 73/290 V |

* cited by examiner

*Primary Examiner* — Eric S McCall
*Assistant Examiner* — Mohammed E Keramet-Amircolai
(74) *Attorney, Agent, or Firm* — Michael Best & Friedrich LLP

(57) ABSTRACT

A three-mode ultrasonic sensor for determining temperature, level, and/or concentration of a fluid. In one embodiment, the sensor includes a target positioned at a level; a controller, and a transducer electrically connected to the controller. The controller is configured to generate an ultrasonic signal, to receive a reflection of the ultrasonic signal from at least one of the target and a surface of a fluid, and generate a signal based on the reflection. The controller is further configured to receive the signal, and determine whether a level of the surface of the fluid is one of the following group: above the level of the target, below the level of the target, and substantially the same as the level of the target.

19 Claims, 4 Drawing Sheets

THREE-MODE SENSOR FOR DETERMINING TEMPERATURE, LEVEL, AND CONCENTRATION OF A FLUID

BACKGROUND

The present invention relates to ultrasonic level and/or concentration sensors.

Ultrasonic transducers can be used to measure a distance to the surface of a liquid. In some situations, a transducer is positioned at the top of a tank for a liquid. In many circumstances, the tank of interest is a liquid tank (for example, a fuel tank) of an automobile, truck, or other vehicle. An ultrasonic signal is generated by the transducer and the time it takes for the signal to travel from the transducer at the top of the tank to the surface of the liquid, reflect off the surface of the liquid, and return to the transducer is measured. If certain information about the tank is known, such as its volume or dimensions, the time measurement can be used in a calculation to determine how much liquid is in the tank.

SUMMARY

In one embodiment, the invention provides an ultrasonic sensor for measuring a level and concentration of a fluid that is designed to be placed at the bottom of a tank. The ultrasonic sensor comprises a target, a transducer, and controller such as a microcontroller or other processor-based controller. The target is positioned at a predetermined level. The transducer is electrically connected to the controller. The controller and transducer are, generally, part of a single unit (although the controller could be positioned apart or remote from the transducer). The transducer is configured to generate an ultrasonic signal, to receive a reflection of the ultrasonic signal from at least one of the target and a surface of a fluid, and generate a signal based on the reflection. The controller is configured to receive the signal from the transducer and determine whether a level of the surface of the fluid is above the level of the target, below the level of the target, or substantially the same as the level of the target.

Unlike most prior-art ultrasonic sensors known to the inventors, the ultrasonic sensor described herein uses a single transducer instead of two or more transducers. Using a single transducer provides less information than using two or more. Perhaps more important, when a single transducer is used, there are circumstances where it is not possible to perform certain calculations or determine certain conditions because the single transducer provides no or insufficient information. The controller connected to the single transducer is configured to compensate for the deficiencies created by using a single transducer.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. More particularly, no single element or feature should be deemed indispensable or essential merely because it is described as part of a particular embodiment or example explained or set forth herein.

Figure 1:
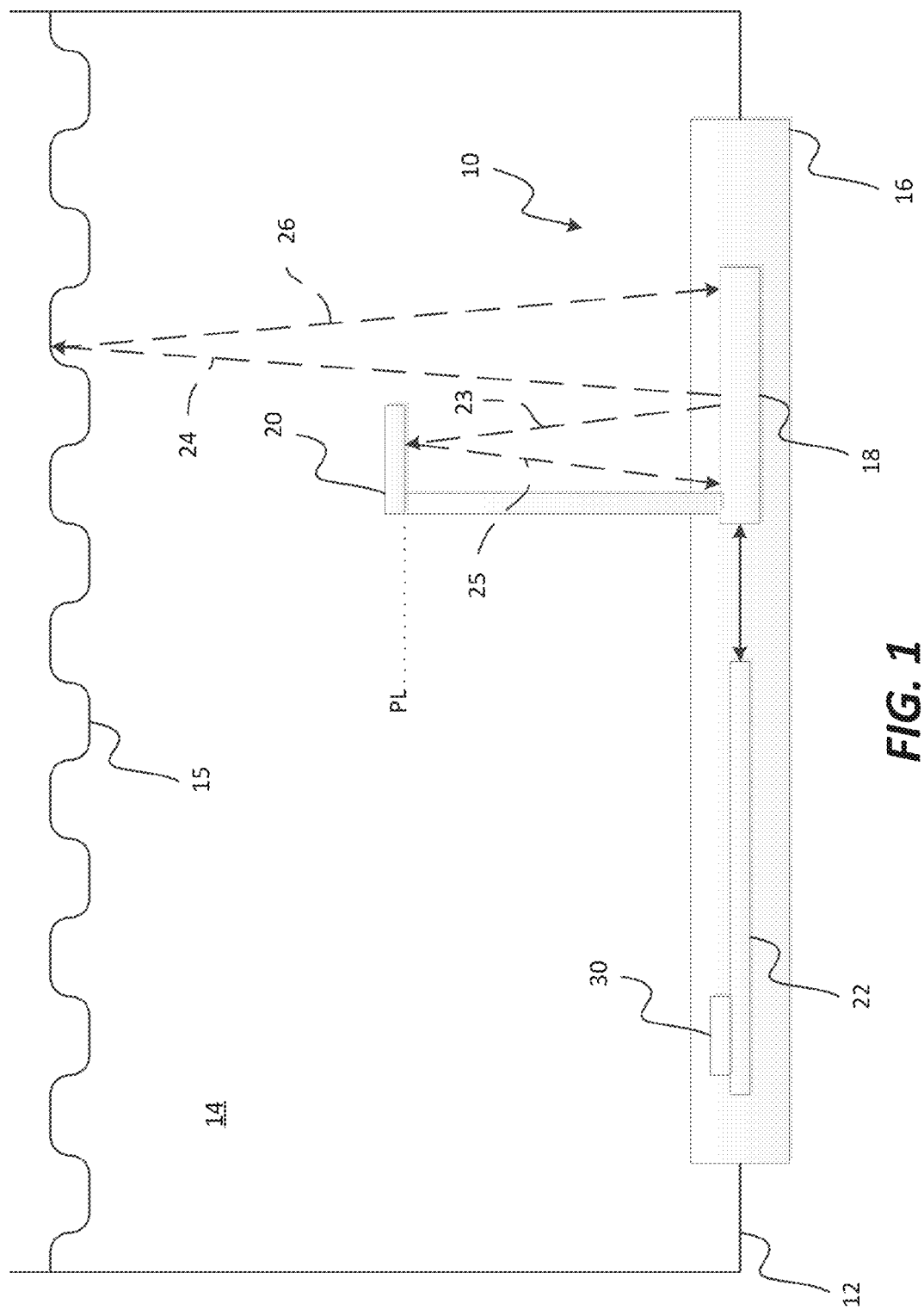
FIG. 1 is a schematic illustration of an ultrasonic sensor placed at the bottom of a liquid or fluid container.

FIG. 1 illustrates an ultrasonic sensor 10. The sensor 10 can provide information regarding the level, concentration, or both of a fluid. In the embodiment, shown the sensor 10 is positioned at the bottom of a tank 12 or similar container filled with a fluid 14, such as a diesel exhaust fluid ("DEF") (e.g., Ad Blue liquid). The fluid 14 has a top surface 15. The level of the top surface 15 changes over time as the fluid is consumed, for example, in an exhaust system. The ultrasonic level and/or concentration sensor 10 includes a housing 16, a piezoelectric transducer 18, and a reference point or target 20. The target is located at a predetermined level (marked as "PL" in FIG. 1). In the embodiment shown, the sensor 10 includes a printed circuit board 22 with a thermistor and other components, including a controller. (These components are described in greater detail below). A signal from the controller (which may be amplified or otherwise conditioned by a driver circuit) is provided to the transducer 18. The transducer 18 generates an ultrasonic sound wave that propagates through the fluid 14. A portion of the sound wave (represented by dashed line 23) propagates through the fluid 14 to the target 20, while another portion of the sound wave (represented by dashed line 24) propagates through the fluid 14 to the surface 15. At least a portion of the sound wave (represented by dashed line 25) is reflected from the target 20 back to the transducer 18 (as an echo). A different portion of the sound wave (represented by dashed line 26) is reflected from the surface 15 back to the transducer 18 (as an echo). In response to receiving the reflections or echoes, the transducer 18 generates an electric signal which is provided to a controller on a circuit board 22. The signal from the transducer 18 is processed in the controller to generate, for example, a signal indicative of the level of fluid 14 in the tank 12.

Figure 2:
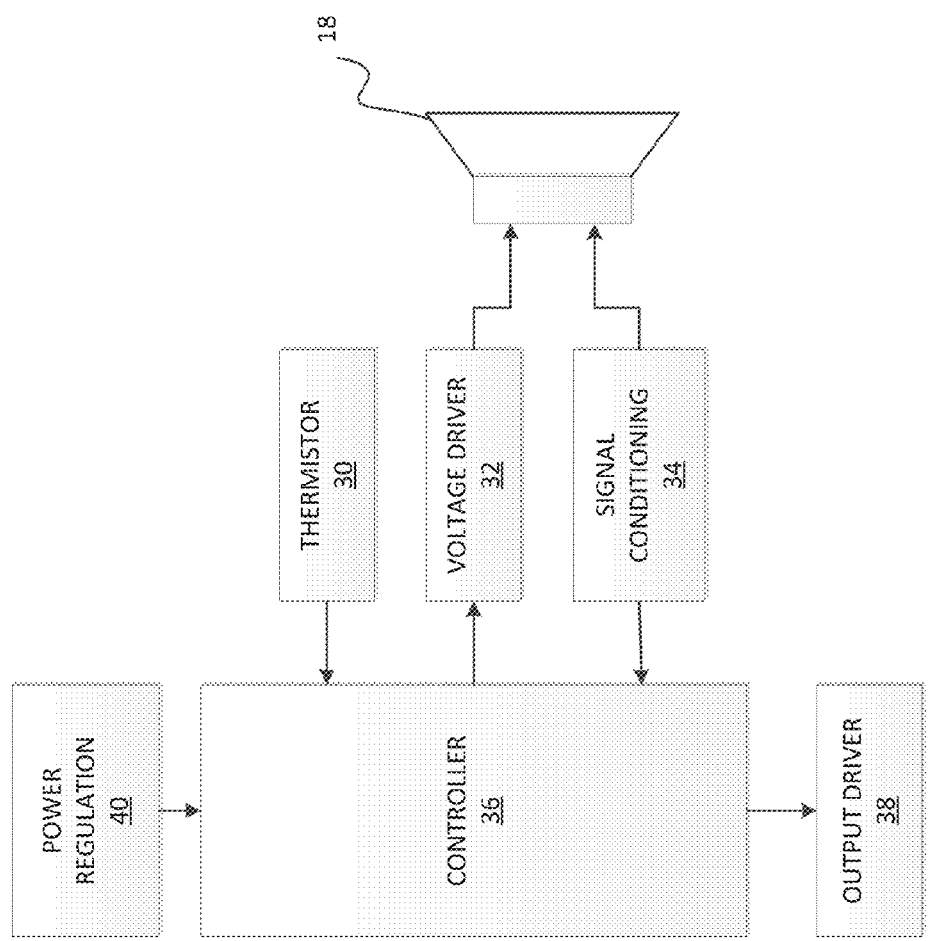
FIG. 2 is a schematic illustration of the circuitry of the ultrasonic sensor illustrated in FIG. 1.

FIG. 2 illustrates certain electrical components of the sensor 10 including components that are mounted on the printed circuit board 22. In the embodiment shown, a thermistor 30 is mounted on the circuit board 22. The circuit board may also include a voltage driver 32, a signal conditioning circuit 34, a controller 36 (in the form, for example, of a microcontroller), an output driver 38, and a power regulation circuit 40. The controller includes (or is connected to) memory such as RAM and ROM and executes software that can be stored in the RAM (particularly during execution), the ROM (on a generally permanent basis), or another non-transitory computer readable medium such as other memory or disc. If necessary, the controller can be connected to such memory or a disc drive to read such software. A microprocessor or other programmable device with suitable memory and I/O devices could also be used.

Temperature information from the thermistor 30 (or other temperature sensor) is provided to the controller 36 and is used by the controller 36 to help it compensate for variations in the speed of sound that occur as a result of changes in temperature. On a regular basis (or as otherwise programmed), the controller generates a transducer control signal which is delivered to the voltage driver 32. The voltage driver 32 amplifiers or otherwise conditions the control signal from controller 36 and provides the amplified signal to the transducer 18. When energized by the amplified signal, transducer 18 produces an output sound wave or, more particularly, an ultrasonic sound wave. In addition to generating sound waves, the transducer 18 also responds to sound waves (such as reflections or echoes) by converting the received sound waves into electric signals (referred to as a "reflection signal"). Such signals are conditioned by signal conditioning circuit 34 and provided to the controller 36. In response to a reflection signal, the controller 36 generates an output signal indicative of the elapsed time between the moment the transducer 18 sent out its ultrasonic signal (based on the transducer control signal) and the moment the transducer 18 received a reflection of the ultrasonic signal (resulting in the generation of a reflection signal). (The reflection causes the transducer (which is a piezoelectric element) to move and this movement is converted to an electric signal.) This "time of flight" (the time between generation of the ultrasonic sound wave or ping and receipt of the reflection or echo), along with the speed of sound within the fluid 14 in the tank, can be used to determine the distance from the sensor 10 to the top surface 15. In other words, the height or level of the fluid 14 in the tank can be determined. (The time between the transmitted ultrasonic pulse and the received echo is proportional to the distance the sound wave traveled through the liquid as expressed by the equation: Distance=(Speed of Sound)×(Time of Flight)/2). Provided other information is available and programmed into the controller 36, the distance measurement may also be used to determine the volume of fluid 14 in the tank 12. In some embodiments, the controller 36 modulates the power level of the output sound wave from the transducer 18 so that the minimum power level to receive an echo is used. By modulating the power level multiple echoes are prevented from affecting the time of flight.

The speed of sound of the fluid 14 can be determined using the reflection of the sound wave off of the reference point or target 20. The speed of sound of the fluid 14 is proportional to the distance the sound wave has traveled and the time of flight. Because the target 20 is at a known distance from the transducer 18, the distance the sound wave travels is known. The time of flight of the reflection is determined as discussed above. Therefore, the speed of sound of the fluid 14 can be determined by the equation: Speed of Sound=(2×Distance)/(Time of Flight).

Figure 3:
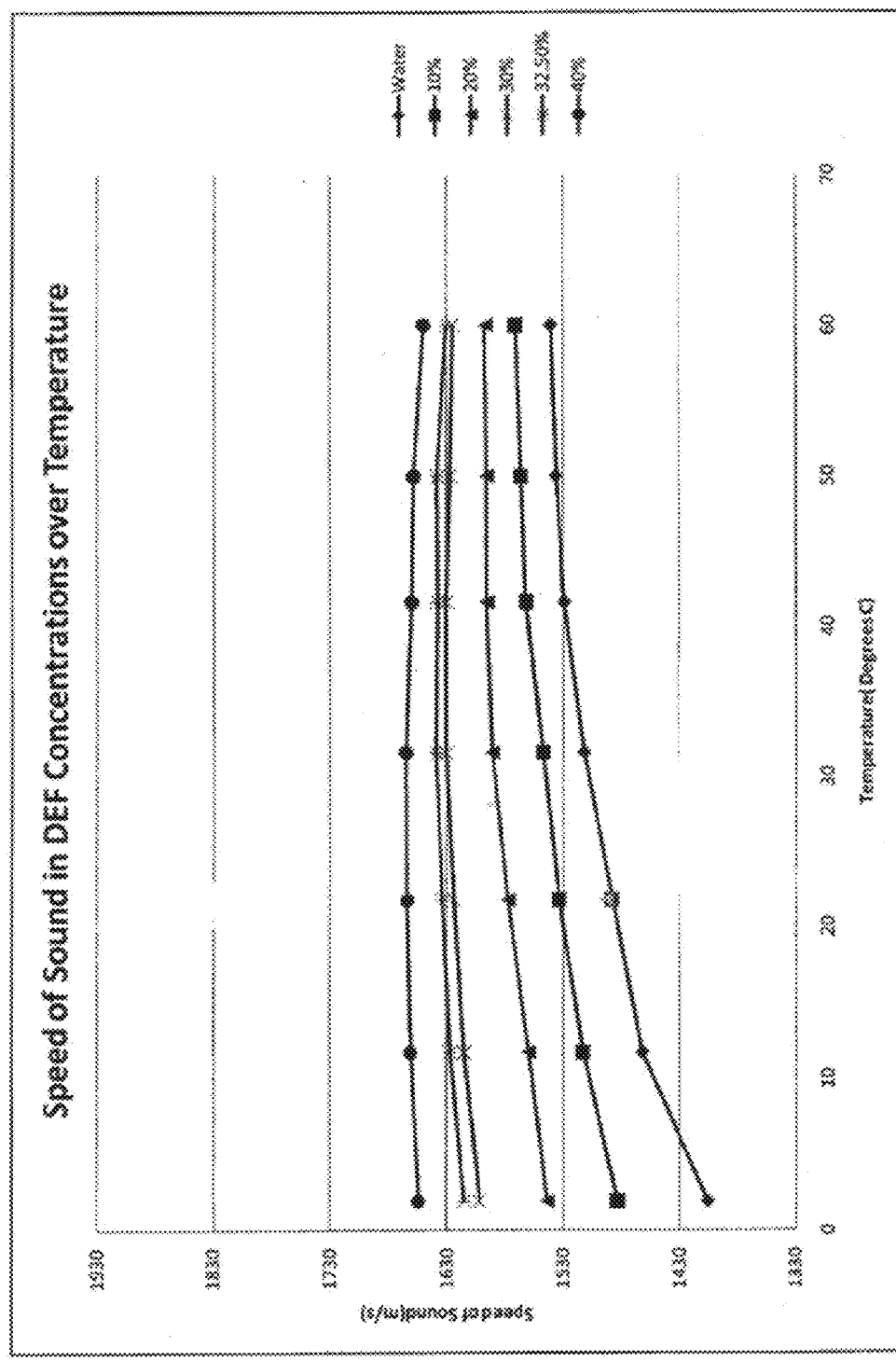
FIG. 3 is a chart of the speed of sound versus temperature for various DEF concentrations.

The controller 36 determines the concentration of the fluid 14 by using the calculated speed of sound and the temperature of the fluid 14. The temperature of the fluid 14 is determined based on information provided by the thermistor 30. The controller 36 applies the calculated speed of sound and the determined temperature to a look-up table such as that shown in FIG. 3.

The sensor 10 has three independent modes of operation, depending on the level of the fluid 14 in the tank 12 in relation to the level of the target 20. In particular, because of the configuration of the sensor 10, the top surface 15 of the fluid 14 may be located at one of three general positions or levels within the tank 12. First, the level of the top surface 15 of the fluid 14 may be above the target 20. Second, the level of the top surface 15 of the fluid 14 may be near or at substantially the same level as the target 20. Third, the level of the top surface 15 of the fluid 14 may be below the level of the target 20. The controller 36 operates in three modes corresponding to the three circumstances or situations just described.

When two distinct echoes are received by the sensor 10, it is assumed that the fluid 14 level is above the level PL of the target 20. The echo received by the transducer 18 with the smaller time of flight is assumed to be the reflection from the target 20. The time of flight of the reflection from the target 20 is compared to a first reference time window as a plausibility check. The first reference time window is a predetermined range of plausible times of flight of a received reflection from the target 20. If the sensed time of flight is within this range, the speed of sound within the fluid 14 is calculated as discussed above. The echo received by the transducer 18 with the larger time of flight is assumed to be the reflection from the top surface 15 of the fluid 14. The time of flight of the reflection from the top surface 15 is compared to a second reference time window as a plausibility check. The second reference time window is a predetermined range of plausible times of flight of a received reflection from the top surface 15. If the sensed time of flight is within the second reference time window, the level of the top surface 15 is determined by using the calculated speed of sound (from the reflection of the target 20) along with the time of flight of the reflection from the top surface 15. The level is determined using the equation discussed above: Distance=(Speed of Sound)×(Time of Flight)/2.

When one or two echoes are received by the sensor 10 within the first reference time window, the level of the top surface 15 is near or substantially the same as the level PL of the target 20. Therefore, the level of the top surface 15 is determined to be equal to the distance of the target 20 from the sensor 10.

When the first echo received is outside the first reference time window or, more particularly, received at a time that is less than the lower limit of the first reference time window, the level of the top surface 15 is below the target 20. A shorthand way of indicating that the echo is received at a time that is less that the lower limit of the reference time window is to say that the "echo is less than the window." The level of the top surface 15 is then determined using an assumed speed of sound, rather than a calculated speed of sound. When the first echo is received in an elapsed time that is less that the lower limit of the first reference time window, the concentration of the fluid 14 cannot be determined.

Figure 4:
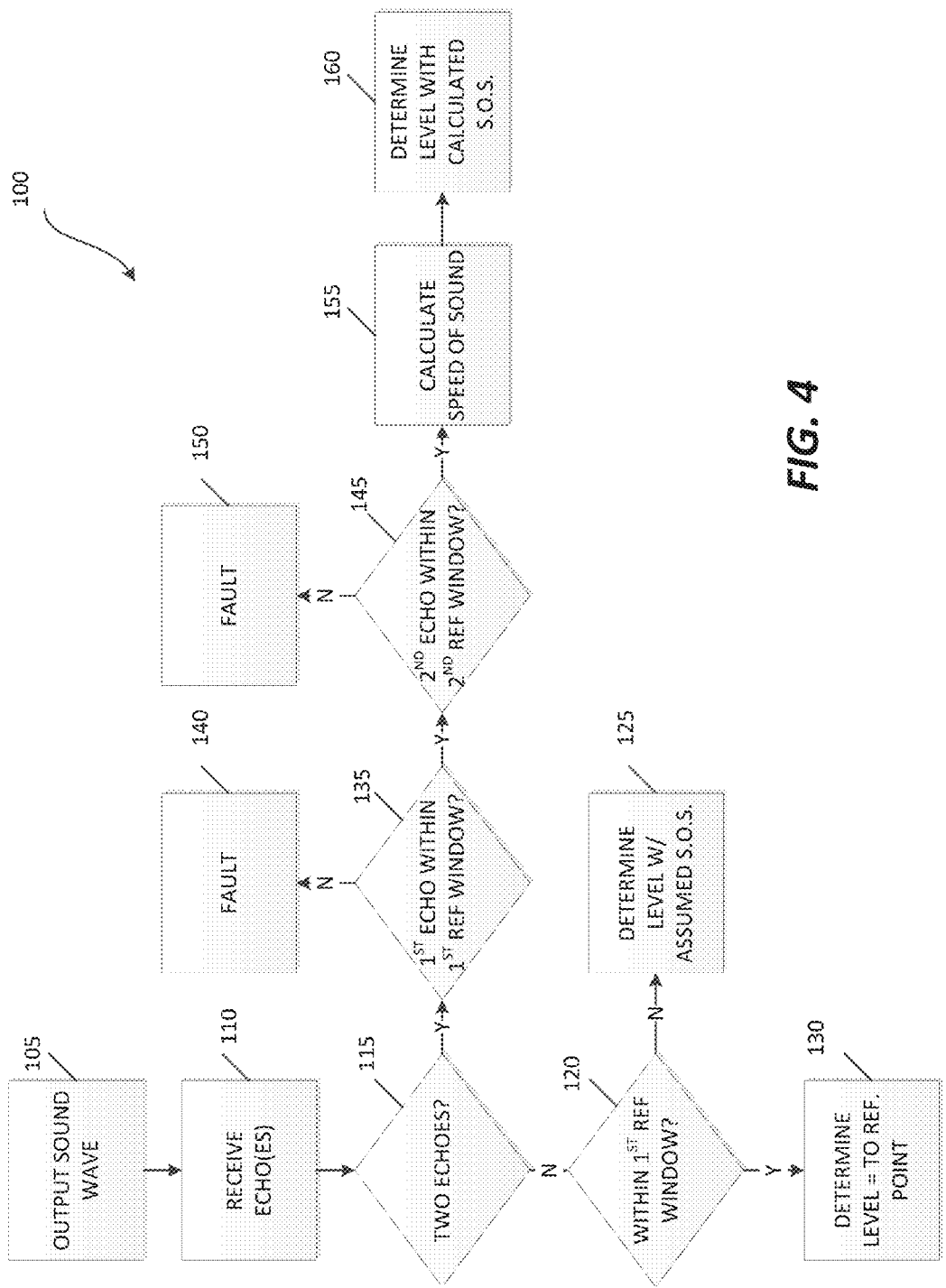
FIG. 4 is a flowchart illustrating the operation of software executed by a controller of the ultrasonic sensor.

FIG. 4 is a flow chart illustrating the operation of software executed by the controller 36. The process 100 begins with the transducer 18 outputting an ultrasonic signal in the form of a sound wave (Step 105). The transducer 18 then receives one or two echoes of the sound wave (Step 110). The controller 36 determines if two distinct echoes were received by the transducer 28 (Step 115). If two distinct echoes were not received by the transducer 28, controller 36 determines if the received echo is within the first reference time window (Step 120). If the received echo is not within the first reference time window, the controller 36 determines the level of the top surface 15 based on an assumed speed of sound (Step 125). If the received echo is within the first reference time window, the controller 36 determines that the level of the top surface 15 is equal to the distance of the target 20 (Step 130).

If the controller 36 determines that two distinct echoes were received by the transducer 28, the controller then determines whether the first echo received is within the first reference window (Step 135). If the first echo received is outside the first reference window, controller 36 registers a fault (Step 140). If the first echo received is within the first reference window, controller 36 determines whether the second echo received is within the second reference window (Step 145). If the second echo received is outside the second reference window, controller 36 registers a fault (Step 150). If the second echo received is within the second reference window, controller 35 determines the speed of sound within the fluid 14 using the time of flight of the first echo (Step 155). The controller 35 then determines the level of the top surface 15 using the calculated speed of sound within the fluid 14 along with the time of flight of the second echo (Step 160).

The controller 35 generates an output signal which may be in a digital or analog form. The output signal is a representation of the concentration (which may be referred to a "concentration signal"), temperature (which may be referred to as a "temperature signal"), or level (which may be referred to as a "level signal") of the fluid 14. It is also possible that the output signal could be representative of or contains information regarding a combination of concentration, temperature, and/or level. For example, concentration in a first group of bits or word and level in a second group of bits or word. As noted above, concentration may be determined by using a look-up table stored in memory based on information shown, for example, in FIG. 3. Temperature, as explained above, may be determined based on information from the thermistor. The level of the fluid 14 is also determined as described above. The controller may be configured, for example, via software, to provide one, two, or all three of fluid concentration, temperature, and level in the output signal. The output signal is provided to the output driver 38, which conveys the measurements to an external controller for managing and controlling the function of a vehicle's DEF system. The output driver 38 may take the form of a digital driver that outputs a signal compatible with J1939 or CAN bus standards. So configured, the output driver 38 provides for direct communication to the vehicle's data bus. The output driver 38 may generate another suitable analog or digital signal, depending on the needs of the specific application.

Thus, the invention provides, among other things, a sensor for measuring temperature, fluid level, and concentration of diesel exhaust fluid. Various features and advantages of the invention are set forth in the following claims.

What is claimed is:

1. An ultrasonic sensor, the sensor comprising:
   a target positioned at a level;
   a controller, and
   a transducer electrically connected to the controller, the transducer configured to generate an ultrasonic signal, to receive a first reflection of the ultrasonic signal from the target and a second reflection of the ultrasonic signal from a surface of a fluid, and to generate a signal based on the first reflection and the second reflection;
   wherein the controller is configured to
      receive the signal,
      determine, based on the signal, whether a level of the surface of the fluid is one selected from the group consisting of above the level of the target, below the level of the target, and substantially the same as the level of the target,
      operate in a first mode when the level of the surface of the fluid is above the target,
      operate in a second mode when the level of the surface of the fluid is below the target, and
      operate in a third mode when the level of the surface of the fluid is substantially the same as the target.

2. The sensor as claimed in claim 1, wherein the controller is further configured to generate a level signal.

3. The sensor as claimed in claim 1, wherein the controller is further configured to generate a concentration signal.

4. The sensor as claimed in claim 1, wherein the controller is further configured to generate a level signal and a concentration signal.

5. The sensor as claimed in claim 1, wherein the controller is further configured to determine when first and second echoes are received by the transducer.

6. The sensor as claimed in claim 5, wherein the controller is further configured to determine whether one or both of the first and second echoes are received within a first reference time window.

7. The sensor as claimed in claim 6, wherein the controller determines that the level of the surface of the fluid is substantially the same as the level of the target when one or both of the first and second echoes are received within the first reference time window.

8. The sensor as claimed in claim 6, wherein the controller determines that the level of the surface of the fluid is below the level of the target when the first echo is less than the first reference time window.

9. The sensor as claimed in claim 1, wherein when operating in the first mode, the controller is further configured to
   calculate a speed of sound, and
   calculate the level of the surface of the fluid based on the speed of sound.

10. The sensor as claimed in claim 1, wherein when operating in the second mode, the controller is further configured to
    calculate the level of the surface of the fluid based on an assumed speed of sound.

11. The sensor as claimed in claim 1, wherein when operating in the third mode, the controller is further configured to
    calculate the level of the surface of the fluid to be the same as the target.

12. An ultrasonic sensor, the sensor comprising:
    a target positioned at a level;
    a controller, and
    a transducer electrically connected to the controller, the transducer configured to generate an ultrasonic signal, to receive a first reflection of the ultrasonic signal from the target and a second reflection of the ultrasonic signal from a surface of a fluid, and to generate a signal based on the first reflection and the second reflection;
    wherein the controller is configured to
       receive the signal,
       determine when a first echo is received by the transducer,
       determine when a second echo is received by the transducer,
       if the first echo and the second echo are received, determine, based on the first echo and the second echo, whether a level of the surface of the fluid is one selected from the group consisting of above the level of the target, below the level of the target, and substantially the same as the level of the target.

13. The sensor as claimed in claim 12, wherein the controller is further configured to generate a level signal.

14. The sensor as claimed in claim 12, wherein the controller is further configured to generate a concentration signal.

15. The sensor as claimed in claim 12, wherein the controller is further configured to generate a level signal and a concentration signal.

16. The sensor as claimed in claim 12, wherein the controller is further configured to determine whether one or both of the first and second echoes are received within a first reference time window.

17. The sensor as claimed in claim 16, wherein if one or both of the first and second echoes are received within the first reference time window, the controller generates an output signal indicating that the level of the surface is near or substantially the same as the level of the target.

18. The sensor as claimed in claim 16, wherein if the first echo is less than the first reference time window, the controller generates an output signal indicating that the level of the surface is below the level of the target.

19. The sensor as claimed in claim 12, wherein the controller is further configured to
- operate in a first mode when the level of the surface of the fluid is above the target,
- operate in a second mode when the level of the surface of the fluid is below the target, and
- operate in a third mode when the level of the surface of the fluid is substantially the same as the target.

* * * * *